(12) United States Patent
Yang

(10) Patent No.: US 8,967,697 B1
(45) Date of Patent: Mar. 3, 2015

(54) AUTOMOTIVE FLOOR MAT STRUCTURE

(71) Applicant: Formosa Saint Jose Corp., Taipei (TW)

(72) Inventor: Ming-Shun Yang, Taipei (TW)

(73) Assignee: Formosa Saint Jose Corp., Taipei (TW)

( * ) Notice: Subject to any disclaimer, the term of this patent is extended or adjusted under 35 U.S.C. 154(b) by 0 days.

(21) Appl. No.: 14/095,587

(22) Filed: Dec. 3, 2013

(30) Foreign Application Priority Data

Oct. 24, 2013 (TW) .............................. 102138491 A

(51) Int. Cl.
*B60N 3/04* (2006.01)

(52) U.S. Cl.
CPC ...................... *B60N 3/048* (2013.01)
USPC ........................................................ 296/97.23

(58) Field of Classification Search
USPC ................... 296/97.23; 15/215; 16/4
See application file for complete search history.

(56) References Cited

U.S. PATENT DOCUMENTS

| | | | | |
|---|---|---|---|---|
| 3,390,912 A | * | 7/1968 | Stata ........................... | 296/97.23 |
| 6,261,667 B1 | * | 7/2001 | Yang ............................. | 428/172 |
| 6,290,279 B1 | * | 9/2001 | Haight et al. .............. | 296/97.23 |
| 6,605,333 B2 | * | 8/2003 | Ferreira et al. ................. | 428/95 |
| 6,736,442 B2 | * | 5/2004 | Gebreselassie et al. ... | 296/97.23 |
| 7,401,837 B2 | * | 7/2008 | MacNeil ..................... | 296/97.23 |
| 7,416,771 B2 | * | 8/2008 | Bailey et al. .................... | 428/83 |
| 7,444,748 B2 | * | 11/2008 | MacNeil ...................... | 29/897.2 |
| 8,163,369 B2 | * | 4/2012 | Stanesic et al. .............. | 428/119 |
| 8,245,368 B2 | * | 8/2012 | Park ......................... | 24/573.11 |
| 8,459,718 B2 | * | 6/2013 | Pehler ........................ | 296/97.23 |
| 8,474,898 B1 | * | 7/2013 | Bielawski et al. ......... | 296/97.23 |
| 8,690,222 B2 | * | 4/2014 | Johnson et al. ............ | 296/97.23 |
| 8,690,233 B2 | * | 4/2014 | Preisler et al. ........... | 296/193.07 |
| 8,757,698 B1 | * | 6/2014 | Rowland ................... | 296/97.23 |
| 2013/0049396 A1 | * | 2/2013 | Goto et al. ................. | 296/97.23 |

* cited by examiner

*Primary Examiner* — Gregory Blankenship
(74) *Attorney, Agent, or Firm* — Juan Carlos A. Marquez; Bacon & Thomas PLLC

(57) ABSTRACT

The present invention discloses automotive floor mat structures. The automotive floor mat structure comprises a containing plate, a bottom surface, a raised edge, a guarding edge, at least one plateau bump and a foot resting pedal. The cross-section of the guarding edge is an inverse-V shape, and one side of the inverse-V is longer than the other side. With the implementation of the present invention, the snow, water, mud, rocks, or foreign bodies carried into the chamber of the automotive can be greatly reduced, the resisting force by the foot resting pedal can prevent the automotive floor mat from being set off by foot accidently, and the plateau bump further prevents snow, water, mud, rocks, or foreign bodies on the containing plate from falling into the car chamber.

10 Claims, 11 Drawing Sheets

AUTOMOTIVE FLOOR MAT STRUCTURE

BACKGROUND OF THE INVENTION

1. Technical Field

The present invention relates to automotive floor mat structures, and more particularly, to an automotive floor mat structure with an inverted V-shaped guarding edge, at least a plateau bump, or a foot resting pedal.

2. Description of Related Art

Increasing transport needs lead to ever-increasing automobile use. At the beginning of a drive or a ride, a driver or a passenger often brings snow, water, mud, rocks, or foreign bodies into the vehicle. Most vehicles are matted. When allowed into a vehicle, snow, water, mud, rocks, or foreign bodies not only take time to get rid of, but also cause unpredictable danger by sneaking into machines or electronic devices after squeezing through gaps therebetween.

Although automotive floor mats have long been in use, none are designed on the basis of thorough evaluation of user needs and consideration given to the likelihood of intrusion of foreign bodies and with a view to applying to more special types of automotive floor as found in car models, such as SUV and pickup wagon.

Accordingly, it is imperative to provide an automotive floor mat structure conducive to great reduction in the likelihood that snow, water, mud, rocks, or foreign bodies intrude into a vehicle, reduction in production costs through mass production, and application to most car models.

SUMMARY OF THE INVENTION

The present invention discloses automotive floor mat structures disposed at an intra-vehicular foot resting area inside a vehicle to greatly reduce the chance that drivers and passengers bring snow, water, mud, rocks, or foreign bodies into vehicles. The automotive floor mat structures is not only conducive to prevention of intrusion of snow, water, mud, rocks, or foreign bodies into vehicles, but is also unlikely to be lifted when the drivers' and passengers' feet come into contact with a foot resting pedal.

The present invention provides an automotive floor mat structure disposed at an intra-vehicular foot resting area inside a vehicle. The automotive floor mat structure comprises: a containing plate for collecting snow, water, mud, rocks, or foreign bodies admitted into the intra-vehicular foot resting area, wherein the containing plate has a first margin positioned proximate to a door of the vehicle and a second margin adjoining the first margin, wherein the first margin and the second margin together define a portion of a periphery of the containing plate; a bottom surface being a downward-facing surface of the containing plate and serving as a contact surface between the automotive floor mat structure and the intra-vehicular foot resting area; a raised edge disposed at the second margin and adapted to prevent snow, water, mud, rocks, or foreign bodies from intruding into the vehicle or the intra-vehicular foot resting area; a guarding edge having an inverted V-shaped cross-section, being extended and fixed to the first margin, and having two ends seamlessly connected to two ends of the raised edge, respectively, wherein a vertex of the inverted V-shaped cross-section of the guarding edge is higher than the containing plate, the inverted V-shaped cross-section having a first leg and a second leg, the first leg adjoining the first margin, and the second leg opposing the first leg and being in contact with the intra-vehicular foot resting area, wherein the first leg, the second leg, and the bottom surface rest on a same plane, wherein a distance between the vertex and the second leg is larger than a distance between the vertex and the first leg; at least a plateau bump disposed on the containing plate, wherein a top of a smaller radius than the at least a plateau bump is centrally disposed on the at least a plateau bump in a manner to allow the top and the at least a plateau bump together to look like a cap; and a foot resting pedal extended from the containing plate and positioned exactly at a foot resting area in front of a driver's seat in the vehicle.

The present invention also provides an automotive floor mat structure disposed at an intra-vehicular foot resting area inside a vehicle. The automotive floor mat structure comprises: a containing plate for collecting snow, water, mud, rocks, or foreign bodies admitted into the intra-vehicular foot resting area, wherein the containing plate has a first margin positioned proximate to a door of the vehicle and a second margin adjoining the first margin, wherein the first margin and the second margin together define a portion of a periphery of the containing plate; a bottom surface being a downward-facing surface of the containing plate and serving as a contact surface between the automotive floor mat structure and the intra-vehicular foot resting area; a raised edge disposed at the second margin and adapted to prevent snow, water, mud, rocks, or foreign bodies from intruding into one of the vehicle and the intra-vehicular foot resting area; and a guarding edge having an inverted V-shaped cross-section, being extended and fixed to the first margin, and having two ends seamlessly connected to two ends of the raised edge, respectively, wherein a vertex of the inverted V-shaped cross-section of the guarding edge is higher than the containing plate, the inverted V-shaped cross-section having a first leg and a second leg, the first leg adjoining the first margin, and the second leg opposing the first leg and being in contact with the intra-vehicular foot resting area, wherein the first leg, the second leg, and the bottom surface rest on a same plane, wherein a distance between the vertex and the second leg is larger than a distance between the vertex and the first leg.

The present invention further provides an automotive floor mat structure disposed at an intra-vehicular foot resting area inside a vehicle. The automotive floor mat structure comprises: a containing plate for collecting snow, water, mud, rocks, or foreign bodies admitted into the intra-vehicular foot resting area, wherein the containing plate has a first margin positioned proximate to a door of the vehicle and a second margin adjoining the first margin, wherein the first margin and the second margin together define a portion of a periphery of the containing plate; a bottom surface being a downward-facing surface of the containing plate and serving as a contact surface between the automotive floor mat structure and the intra-vehicular foot resting area; a raised edge disposed at the second margin and adapted to prevent snow, water, mud, rocks, or foreign bodies from intruding into one of the vehicle and the intra-vehicular foot resting area; and at least a plateau bump disposed on the containing plate, wherein a top of a smaller radius than the at least a plateau bump is centrally disposed on the at least a plateau bump in a manner to allow the top and the at least a plateau bump together to look like a cap.

The present invention further provides an automotive floor mat structure disposed at an intra-vehicular foot resting area inside a vehicle. The automotive floor mat structure comprises: a containing plate for collecting snow, water, mud, rocks, or foreign bodies admitted into the intra-vehicular foot resting area, wherein the containing plate has a first margin positioned proximate to a door of the vehicle and a second margin adjoining the first margin, wherein the first margin and the second margin together define a portion of a periphery of the containing plate; a bottom surface being a downward-facing surface of the containing plate and serving as a contact surface between the automotive floor mat structure and the intra-vehicular foot resting area; a raised edge disposed at the second margin and adapted to prevent snow, water, mud, rocks, or foreign bodies from intruding into one of the vehicle and the intra-vehicular foot resting area; and a foot resting pedal extended from the containing plate and positioned exactly at a foot resting area in front of a driver's seat in the vehicle, wherein a crease is disposed at a junction of the foot resting pedal and the containing plate and adapted to not only increase an opposing force but also prevent the automotive floor mat structure from being lifted when drivers' or passengers' feet come into contact with the foot resting pedal.

Implementation of the present invention at least involves the following inventive steps:

1. reducing greatly the chance that drivers or passengers bring snow, water, mud, rocks, or foreign bodies into vehicles;

2. preventing the automotive floor mat structure from being lifted when drivers' or passengers' feet come into contact with a foot resting pedal; and 3. preventing intrusion of snow, water, mud, rocks, or foreign bodies into vehicle from gaps or holes inside car chamber.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

BRIEF DESCRIPTION OF THE SEVERAL VIEWS OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE EMBODIMENTS OF THE INVENTION

Figure 1A:
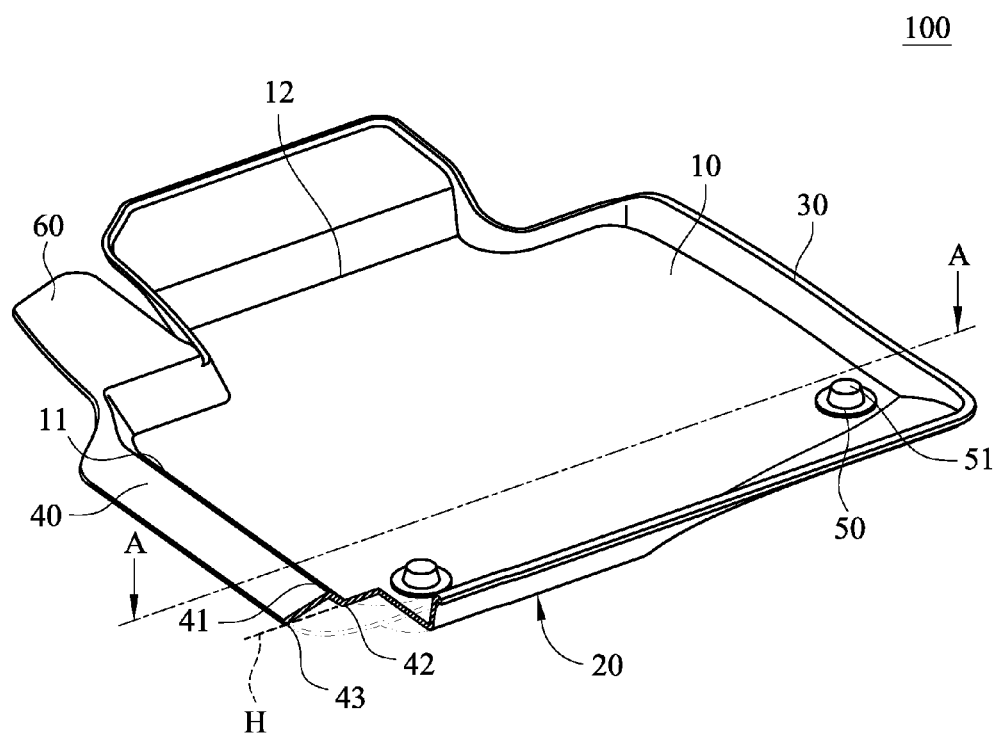
FIG. 1A is a perspective view of an automotive floor mat structure according to an embodiment of the present invention.

Referring to FIG. 1A, an automotive floor mat structure 100 in an embodiment of the present invention is disposed at an intra-vehicular foot resting area inside a vehicle. The automotive floor mat structure 100 comprises a containing plate 10, a bottom surface 20, a raised edge 30, a guarding edge 40, at least a plateau bump 50, and a foot resting pedal 60.

Figure 1B:
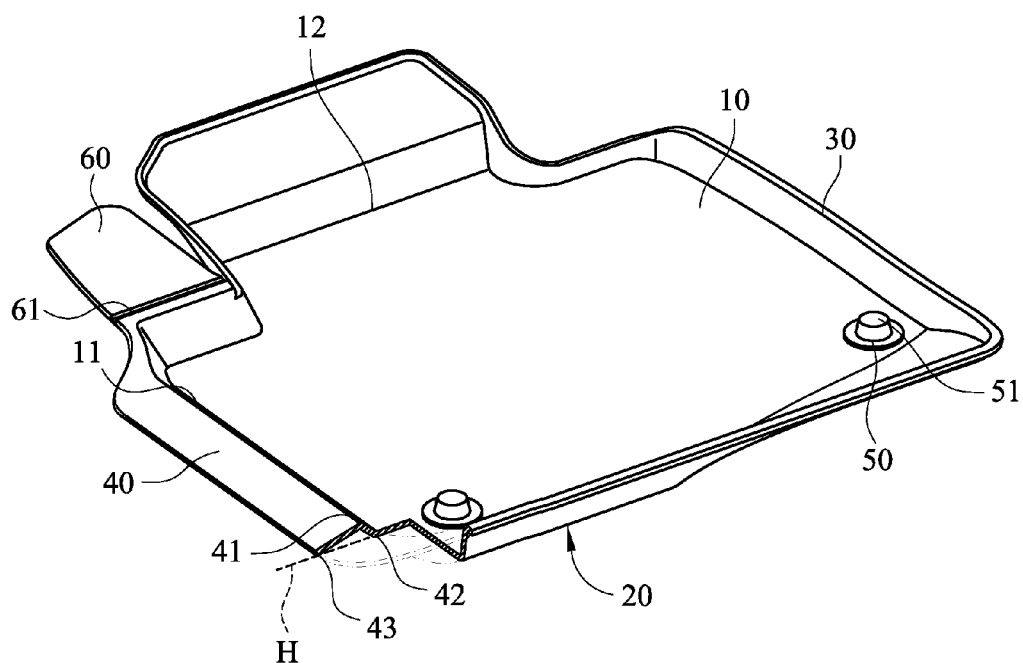
FIG. 1B is a perspective view of the automotive floor mat structure shown in FIG. 1A according to a variant embodiment of the present invention.

Referring to FIG. 1A and FIG. 1B, the containing plate 10 collects snow, water, mud, rocks, or foreign bodies admitted into the intra-vehicular foot resting area. The containing plate 10 has a first margin 11 adapted to be positioned proximate to the door of the vehicle and a second margin 12 which adjoins the first margin 11. The first margin 11 and the second margin 12 together define a portion of the periphery of the containing plate 10. In practice, the containing plate 10 serves widely as a foot resting area for use by a driver or a passenger.

Figure 1C:
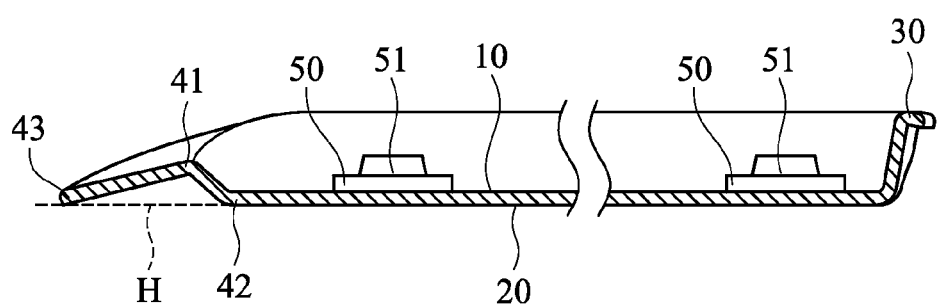
FIG. 1C is a cross-sectional view of the automotive floor mat structure taken along line A-A of FIG. 1A.

Referring to FIG. 1A through FIG. 1C, regarding the automotive floor mat structure 100, as indicated by its name, the bottom surface 20 is the bottom surface of the containing plate 10. The bottom surface 20 serves as the contact surface between the automotive floor mat structure 100 and the intra-vehicular foot resting area. Hence, the bottom surface 20 serves as the contact surface between the automotive floor mat structure 100 and the intra-vehicular foot resting area.

Referring to FIG. 1A and FIG. 1B, the raised edge 30 is disposed at the second margin 12 and adapted to prevent snow, water, mud, rocks, or foreign bodies from intruding into the vehicle or the intra-vehicular foot resting area. If the automotive floor mat structure 100 were not equipped with the raised edge 30, drivers' and passengers' legs and shoes would carry snow, water, mud, rocks, or foreign bodies into the vehicle and thus to the containing plate 10 therein. Furthermore, the raised edge 30 prevents the snow, water, mud, rocks, or foreign bodies from being transferred from the containing plate 10 to the other space inside the vehicle or to the intra-vehicular foot resting area.

The raised edge 30 shown in FIG. 1A and FIG. 1B is either integrally formed with the containing plate 10 or fixed to the containing plate 10 externally.

Referring to FIG. 1A and FIG. 1B, the guarding edge 40, whose cross-section is V-shaped in an upside-down manner, is extended and fixed to the first margin 11. The two ends of the guarding edge 40 are seamlessly connected to the two ends of the raised edge 30, respectively. A vertex 41 of the inverted V-shaped cross-section of the guarding edge 40 is higher than the containing plate 10. The inverted V-shaped cross-section of the guarding edge 40 further has a first leg 42 and a second leg 43. The first leg 42 adjoins the first margin 11. The second leg 43 opposes the first leg 42 and is adapted to come into contact with the intra-vehicular foot resting area.

Referring to FIG. 1A through FIG. 1C, the first leg 42 and the second leg 43 of the guarding edge 40 and the bottom surface 20 rest on the same plane. An extended line H shown in FIG. 1C shows clearly that the first leg 42, the second leg 43, and the bottom surface 20 rest on the same plane.

Referring to FIG. 1A through FIG. 1C, the distance between the vertex 41 and the second leg 43 is larger than the distance between the vertex 41 and the first leg 42. That is to say, as regards the inverted V-shaped cross-section of the guarding edge 40, the two sides which meet at the vertex 41 are unequal in length, wherein the side which adjoins the first margin 11 is shorter than the other side. The fact that the two sides which meet at the vertex 41 are unequal in length gives two advantages to the automotive floor mat structure 100 as follows: the automotive floor mat structure 100 not only manifests flexible use but also is easy to be in tight contact with the intra-vehicular foot resting area.

Referring to FIG. 1A through FIG. 1C, the at least a plateau bump 50 is disposed on the containing plate 10. A top 51 of a smaller radius than the at least a plateau bump 50 is centrally disposed on the at least a plateau bump 50. Alternatively, the top 51 and the at least a plateau bump 50 together look like a cap.

Referring to FIG. 1A and FIG. 1B, the foot resting pedal 60 extended from the containing plate 10 and positioned exactly at a foot resting area in front of the driver's seat in the vehicle.

Referring to FIG. 1B, a crease 61 is disposed at the junction of the foot resting pedal 60 and the containing plate 10. The crease 61 is adapted to not only increase an opposing force acting against an external force exerted upon the foot resting pedal 60, but also prevent the automotive floor mat structure 100 from being lifted when drivers' or passengers' feet come into contact with the foot resting pedal 60.

Figure 2:
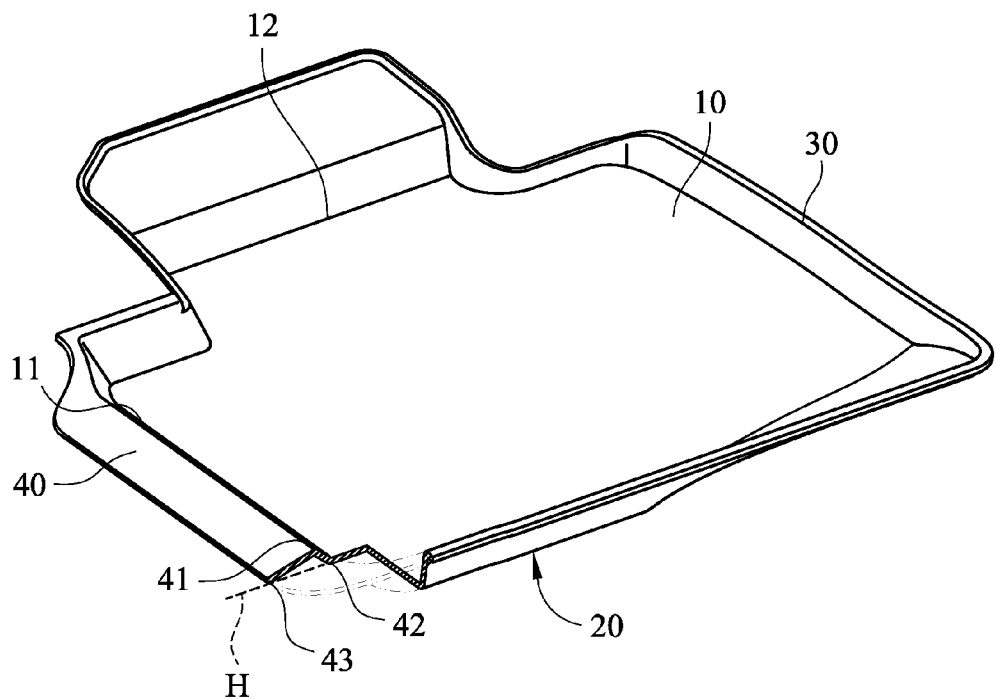
FIG. 2 is a perspective view of an automotive floor mat structure according to another embodiment of the present invention.

Referring to FIG. 2, in another embodiment of the present invention, an automotive floor mat structure 200 is disposed at an intra-vehicular foot resting area inside a vehicle. The automotive floor mat structure 200 comprises a containing plate 10, a bottom surface 20, a raised edge 30, and a guarding edge 40.

The containing plate 10, the bottom surface 20, the raised edge 30 and the guarding edge 40 of the automotive floor mat structure 200 shown in FIG. 2 are identical to the containing plate 10, the bottom surface 20, the raised edge 30 and the guarding edge 40 of the automotive floor mat structure 100, respectively, in terms of features and connection relationships and thus are not described in detail herein for the sake of brevity.

Figure 3:
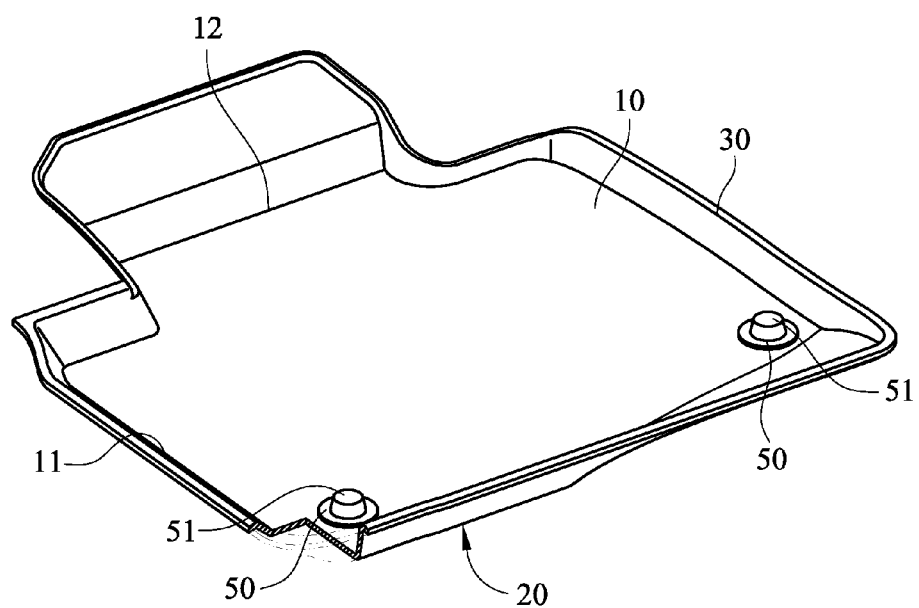
FIG. 3 is a perspective view of an automotive floor mat structure according to yet another embodiment of the present invention.

Referring to FIG. 3, in yet another embodiment of the present invention, an automotive floor mat structure 300 is disposed at an intra-vehicular foot resting area inside a vehicle. The automotive floor mat structure 300 comprises a containing plate 10, a bottom surface 20, a raised edge 30, and at least a plateau bump 50.

The containing plate 10, the bottom surface 20, the raised edge 30 and the at least a plateau bump 50 of the automotive floor mat structure 300 shown in FIG. 3 are identical to the containing plate 10, the bottom surface 20, the raised edge 30 and the at least a plateau bump 50 of the automotive floor mat structure 100, respectively, in terms of features and connection relationships and thus are not described in detail herein for the sake of brevity.

Figure 4:
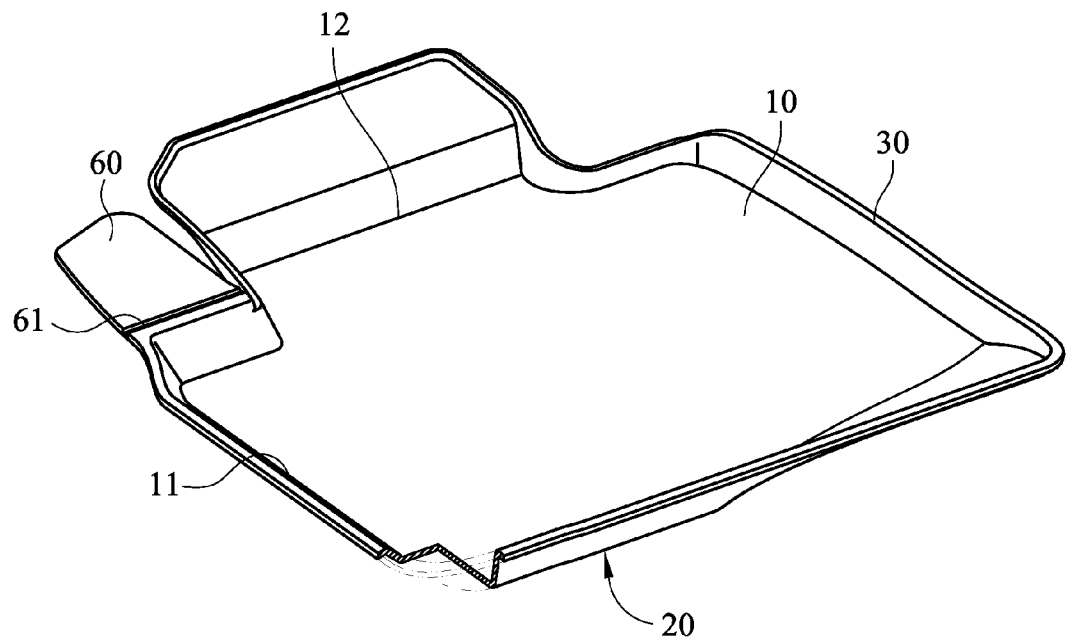
FIG. 4 is a perspective view of an automotive floor mat structure according to a further embodiment of the present invention.

Referring to FIG. 4, in a further embodiment of the present invention, an automotive floor mat structure 400 is disposed at an intra-vehicular foot resting area inside a vehicle. The automotive floor mat structure 400 comprises a containing plate 10, a bottom surface 20, a raised edge 30, and a foot resting pedal 60.

The containing plate 10, the bottom surface 20, the raised edge 30 and the foot resting pedal 60 of the automotive floor mat structure 400 shown in FIG. 4 are identical to the containing plate 10, the bottom surface 20, the raised edge 30 and the foot resting pedal 60 of the automotive floor mat structure 100, respectively, in terms of features and connection relationships and thus are not described in detail herein for the sake of brevity.

Figure 5A:
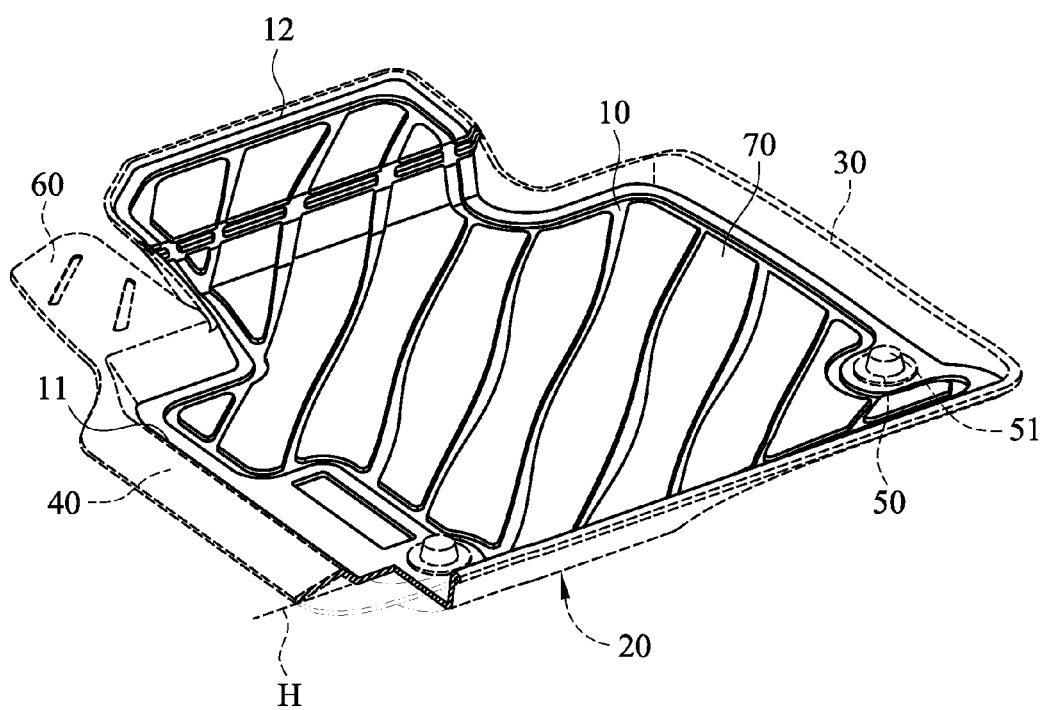
FIG. 5A is a schematic view of a first non-skid structure of the automotive floor mat structure according to the embodiments of the present invention.
Figure 5B:
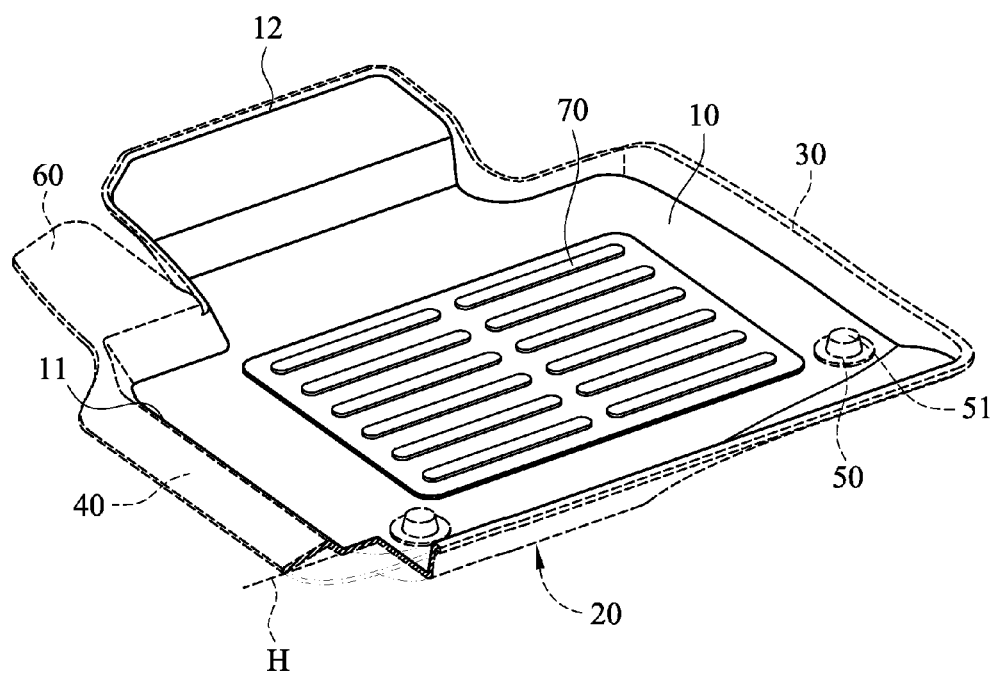
FIG. 5B is a schematic view of another first non-skid structure of the automotive floor mat structure according to the embodiments of the present invention.

Referring to FIG. 5A and FIG. 5B, the containing plate 10 of the automotive floor mat structures 100, 200, 300, 400 in the aforesaid embodiments further forms a first non-skid structure 70. The first non-skid structure 70 is either integrally formed with the containing plate 10 as a unitary structure as shown in FIG. 5A or fixed to the containing plate 10 in a manner shown in FIG. 5B.

The first non-skid structure 70 shown in FIG. 5A and FIG. 5B prevents drivers and passengers from skidding on the containing plate 10 to therefore enhance driving safety and prevent unnecessary intra-vehicular collision.

Figure 6A:
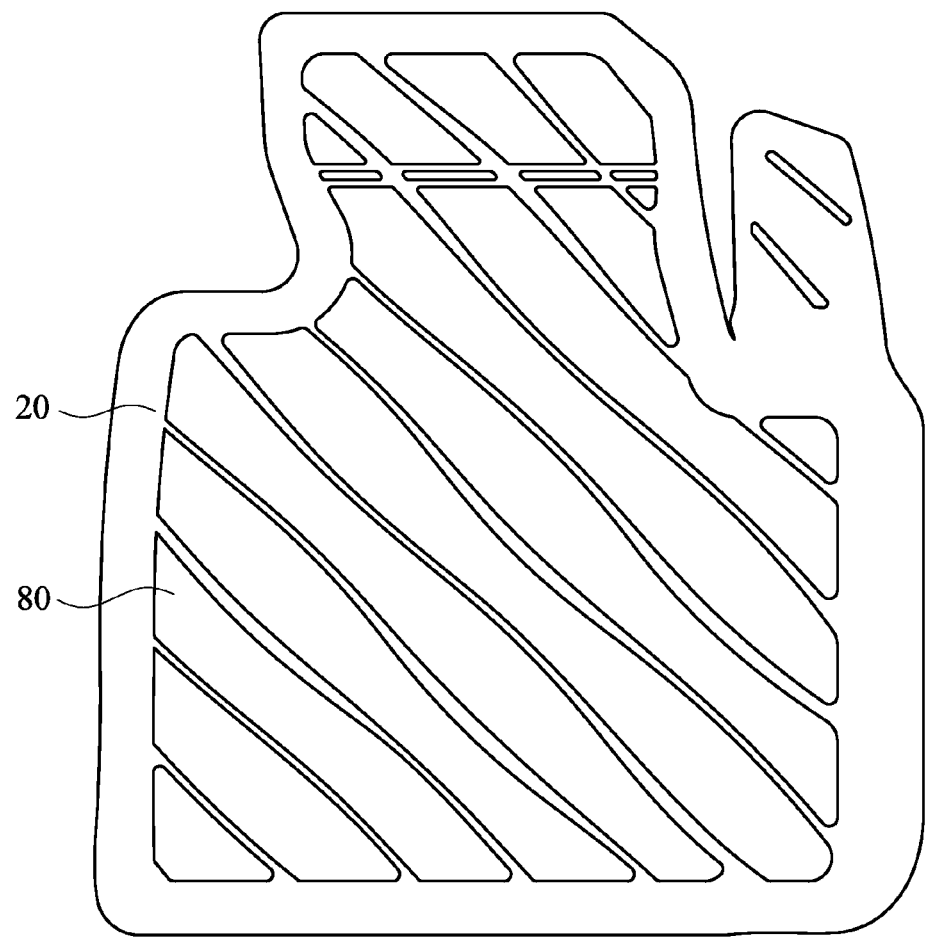
FIG. 6A is a schematic view of a second non-skid structure of the automotive floor mat structure according to the embodiments of the present invention.
Figure 6B:
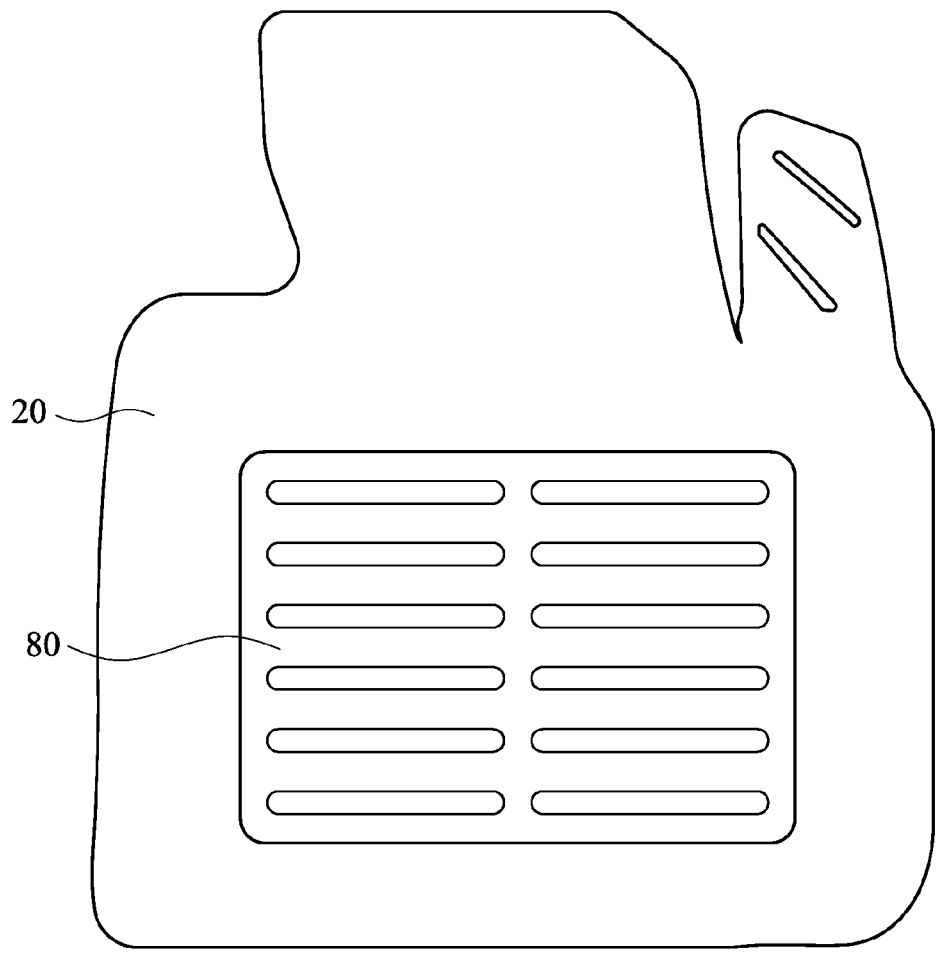
FIG. 6B is a schematic view of another second non-skid structure of the automotive floor mat structure according to the embodiments of the present invention.

Referring to FIG. 6A and FIG. 6B, the bottom surface 20 of the automotive floor mat structures 100, 200, 300, 400 in the aforesaid embodiments further forms a second non-skid structure 80. The second non-skid structure 80 is either integrally formed with the bottom surface 20 as a unitary structure as shown in FIG. 6A or fixed to the bottom surface 20 in a manner shown in FIG. 6B.

The second non-skid structure 80 shown in FIG. 6A and FIG. 6B prevents the automotive floor mat structures 100, 200, 300, 400 at the intra-vehicular foot resting area from skidding to therefore enhance driving safety and prevent unnecessary intra-vehicular collision.

Figure 7A:
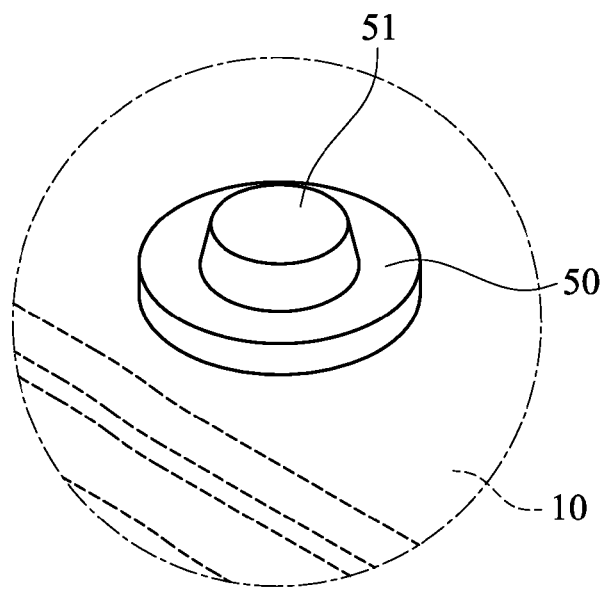
FIG. 7A is a perspective view of a plateau bump and a top which together look like a cap according to the embodiments of the present invention.
Figure 7B:
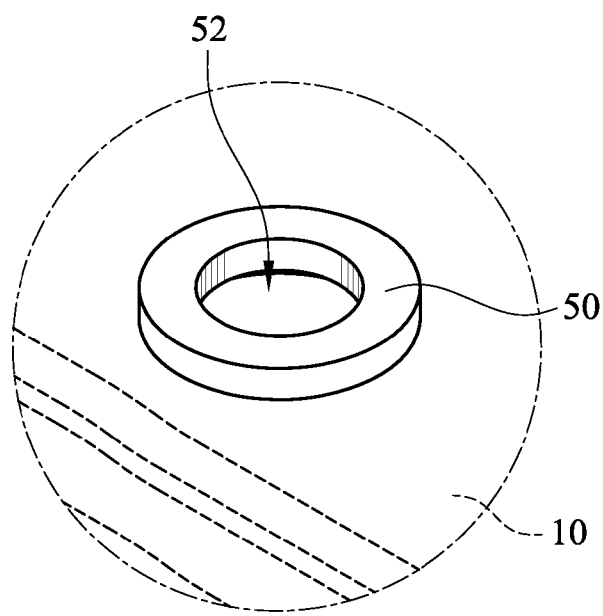
FIG. 7B is a perspective view similar to FIG. 7A, except for removal of the top and formation of a hole at the plateau bump, according to the embodiments of the present invention.

Referring to FIG. 7A and FIG. 7B, the top 51 centrally disposed on the at least a plateau bump 50 of the automotive floor mat structures 100, 300 in the aforesaid embodiments is removable to form a hole 52 which serves a fixing purpose.

Referring to FIG. 7A and FIG. 7B, the hole 52 penetrates the at least a plateau bump 50 centrally until the hole 52 reaches the bottom surface 20. Hence, the at least a plateau bump 50 prevents snow, water, mud, rocks, or foreign bodies at the containing plate 10 from intruding into the intra-vehicular foot resting area via the hole 52.

In the aforesaid embodiments, the automotive floor mat structure 100, the automotive floor mat structure 200, the automotive floor mat structure 300, and the automotive floor mat structure 400 are not only suitable for use with various car models, but are also conducive to great reduction and even effective prevention of intrusion of snow, water, mud, rocks, or foreign bodies into vehicles, thereby enhancing drivers' and passengers' comfort and safety.

The embodiments described above are intended only to demonstrate the technical concept and features of the present invention so as to enable a person skilled in the art to understand and implement the contents disclosed herein. It is understood that the disclosed embodiments are not to limit the scope of the present invention. Therefore, all equivalent changes or modifications based on the concept of the present invention should be encompassed by the appended claims.

What is claimed is:

1. An automotive floor mat structure, disposed at an intra-vehicular foot resting area inside a vehicle, the automotive floor mat structure comprising:
    a containing plate for collecting snow, water, mud, rocks, or foreign bodies admitted into the intra-vehicular foot resting area, wherein the containing plate has a first margin positioned proximate to a door of the vehicle and a second margin adjoining the first margin, wherein the first margin and the second margin together define a portion of a periphery of the containing plate;

a bottom surface being a downward-facing surface of the containing plate and serving as a contact surface between the automotive floor mat structure and the intra-vehicular foot resting area;

a raised edge disposed at the second margin and adapted to prevent snow, water, mud, rocks, or foreign bodies from intruding into one of the vehicle and the intra-vehicular foot resting area;

a guarding edge having an inverted V-shaped cross-section, being extended and fixed to the first margin, and having two ends seamlessly connected to two ends of the raised edge, respectively, wherein a vertex of the inverted V-shaped cross-section of the guarding edge is higher than the containing plate, the inverted V-shaped cross-section having a first leg and a second leg, the first leg adjoining the first margin, and the second leg opposing the first leg and being in contact with the intra-vehicular foot resting area, wherein the first leg, the second leg, and the bottom surface rest on a same plane, wherein a distance between the vertex and a free end of the second leg is larger than a distance between the vertex and an end of the first leg adjacent the first margin;

at least a plateau bump disposed on the containing plate, wherein a top of a smaller radius than the at least a plateau bump is centrally disposed on the at least a plateau bump in a manner to allow the top and the at least a plateau bump together to look like a cap; and a foot resting pedal extended from the containing plate and positioned exactly at a foot resting area in front of a driver's seat in the vehicle.

2. The automotive floor mat structure of claim 1, wherein a crease is disposed at a junction of the foot resting pedal and the containing plate and adapted to not only increase an opposing force but also prevent the automotive floor mat structure from being lifted when drivers' or passengers' feet come into contact with the foot resting pedal.

3. The automotive floor mat structure of claim 1, wherein the containing plate further has a first non-skid structure, and the first non-skid structure is either integrally formed with the containing plate as a unitary structure or fixed to the containing plate.

4. The automotive floor mat structure of claim 1, wherein the bottom surface further has a second non-skid structure, and the second non-skid structure is either integrally formed with the bottom surface as a unitary structure or fixed to the bottom surface.

5. The automotive floor mat structure of claim 1, wherein the raised edge is either integrally formed with the containing plate or fixed to the containing plate externally.

6. The automotive floor mat structure of claim 1, wherein the top is removable to form a hole penetrating the at least a plateau bump until the hole reaches the bottom surface, wherein the at least a plateau bump prevents snow, water, mud, rocks, or foreign bodies at the containing plate from intruding into the intra-vehicular foot resting area via the hole.

7. An automotive floor mat structure, disposed at an intra-vehicular foot resting area inside a vehicle, the automotive floor mat structure comprising:

a containing plate for collecting snow, water, mud, rocks, or foreign bodies admitted into the intra-vehicular foot resting area, wherein the containing plate has a first margin positioned proximate to a door of the vehicle and a second margin adjoining the first margin, wherein the first margin and the second margin together define a portion of a periphery of the containing plate;

a bottom surface being a downward-facing surface of the containing plate and serving as a contact surface between the automotive floor mat structure and the intra-vehicular foot resting area;

a raised edge disposed at the second margin and adapted to prevent snow, water, mud, rocks, or foreign bodies from intruding into one of the vehicle and the intra-vehicular foot resting area; and a guarding edge having an inverted V-shaped cross-section, being extended and fixed to the first margin, and having two ends seamlessly connected to two ends of the raised edge, respectively, wherein a vertex of the inverted V-shaped cross-section of the guarding edge is higher than the containing plate, the inverted V-shaped cross-section having a first leg and a second leg, the first leg adjoining the first margin, and the second leg opposing the first leg and being in contact with the intra-vehicular foot resting area, wherein the first leg, the second leg, and the bottom surface rest on a same plane, wherein a distance between the vertex and a free end of the second leg is larger than a distance between the vertex and an end of the first leg adjacent the first margin.

8. The automotive floor mat structure of claim 7, wherein the containing plate further has a first non-skid structure, and the first non-skid structure is either integrally formed with the containing plate as a unitary structure or fixed to the containing plate.

9. The automotive floor mat structure of claim 7, wherein the bottom surface further has a second non-skid structure, and the second non-skid structure is either integrally formed with the bottom surface as a unitary structure or fixed to the bottom surface.

10. The automotive floor mat structure of claim 7, wherein the raised edge is either integrally formed with the containing plate or fixed to the containing plate externally.

* * * * *